United States Patent
Suzuki et al.

(10) Patent No.: US 8,360,196 B2
(45) Date of Patent: Jan. 29, 2013

(54) WORM WHEEL, POWER STEERING APPARATUS INCLUDING THE WORM WHEEL, AND METHOD OF FORMING THE WORM WHEEL

(75) Inventors: Tatsuro Suzuki, Atsugi (JP); Satoshi Taniuchi, Fujisawa (JP); Kohtaro Shiino, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 27 days.

(21) Appl. No.: 12/971,372

(22) Filed: Dec. 17, 2010

(65) Prior Publication Data

US 2011/0147112 A1 Jun. 23, 2011

(30) Foreign Application Priority Data

Dec. 21, 2009 (JP) ................. 2009-288927

(51) Int. Cl.
 *B62D 5/04* (2006.01)
 *F16H 55/17* (2006.01)

(52) U.S. Cl. .......................... 180/444; 74/458
(58) Field of Classification Search .............. 74/458; 180/443, 444, 446
 See application file for complete search history.

(56) References Cited

U.S. PATENT DOCUMENTS 7,240,762 B2 * 7/2007 Shiina et al. ............ 180/444

FOREIGN PATENT DOCUMENTS

JP 2000-130564 A 5/2000

* cited by examiner

*Primary Examiner* — Tashiana Adams
*Assistant Examiner* — Marc A Scharich
(74) *Attorney, Agent, or Firm* — Foley & Lardner LLP

(57) ABSTRACT

A worm wheel including an annular worm wheel main body formed from a resin material; teeth on an outer periphery of the worm wheel main body in a circumferential direction of the worm wheel main body a; a first region on respective tooth flanks of the teeth and offset from a mid-position of a whole depth of the respective teeth in a radially outward direction of the worm wheel main body; a first region; and a second region.

10 Claims, 11 Drawing Sheets

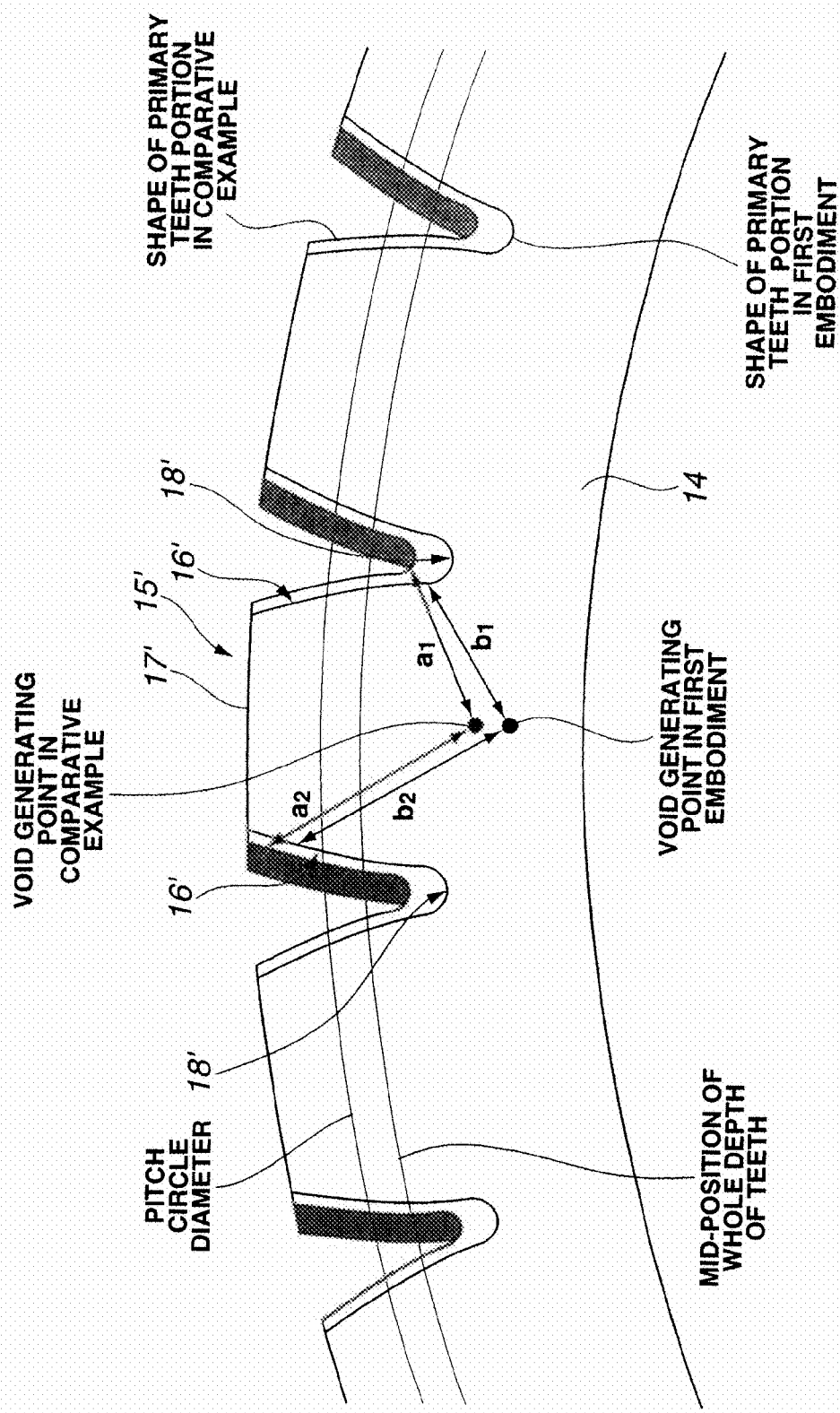

COMPARATIVE EXAMPLE

FIRST EMBODIMENT

WORM WHEEL, POWER STEERING APPARATUS INCLUDING THE WORM WHEEL, AND METHOD OF FORMING THE WORM WHEEL

BACKGROUND OF THE INVENTION

The present invention relates to a worm wheel, an electric power steering apparatus including the worm wheel, and a method of forming the worm wheel.

Japanese Patent Application Unexamined Publication No. 2000-130564 discloses a method of forming a worm wheel, in which a resin material is subjected to insert injection molding with a core metal as an insert, and then the injection-molded article is subjected to machining by a hob to thereby provide the worm wheel with teeth.

SUMMARY OF THE INVENTION

However, voids (air bubbles) are generated in the molded article during the injection molding in the above-described conventional art. There is a demand to suppress expansion of the voids toward the side of a tooth crest of the worm wheel.

It is an object of the present invention to provide a worm wheel capable of suppressing expansion of voids toward the side of a tooth crest thereof, an electric power steering apparatus with the worm wheel and a method of forming the worm wheel.

In a first aspect of the present invention, there is provided a worm wheel comprising:

an annular worm wheel main body formed from a resin material by injection molding; and a plurality of teeth disposed on an outer periphery of the worm wheel main body in a circumferential direction of the worm wheel main body, the plurality of teeth comprising tooth flanks which are brought into meshing engagement with a worm shaft, a tooth crest disposed on an outer peripheral surface of the respective teeth, and a tooth bottom disposed between respective adjacent pairs of the tooth flanks which face each other in the circumferential direction of the worm wheel main body, wherein a non-cutting region is provided on the respective tooth flanks and located offset from a mid-position of a whole depth of the respective teeth in a radially outward direction of the worm wheel main body, the non-cutting region not formed by cutting by a hob after completion of the injection molding, and a cutting region is provided on the respective tooth flanks, the cutting region being formed by cutting by the hob after completion of the injection molding.

In a second aspect of the present invention, there is provided the worm wheel according to the first aspect, further comprising a non-cutting region provided in at least one end portion of the tooth bottom in an axial direction of the worm wheel main body, the non-cutting region not formed by cutting by a hob after completion of the injection molding.

In a third aspect of the present invention, there is provided a worm wheel comprising:

an annular worm wheel main body formed from a resin material by injection molding; and a plurality of teeth disposed on an outer periphery of the worm wheel main body in a circumferential direction of the worm wheel main body, the plurality of teeth comprising tooth flanks which are brought into meshing engagement with a worm shaft, a tooth crest disposed on an outer peripheral surface of the respective teeth, and a tooth bottom disposed between respective adjacent pairs of the tooth flanks which face each other in the circumferential direction of the worm wheel main body, wherein a non-cutting region is provided in at least one end portion of the respective tooth flanks in an axial direction of the worm wheel main body which is located at an end portion on a side of the tooth crest, the non-cutting region not formed by cutting by a hob after completion of the injection molding, and a cutting region is provided on the respective tooth flanks, the cutting region being formed by cutting by the hob after completion of the injection molding.

In a fourth aspect of the present invention, there is provided an electric power steering apparatus comprising:

a steering mechanism coupled to steerable road wheels;

a reduction mechanism coupled to the steering mechanism, the reduction mechanism including a worm wheel and a worm shaft meshing with the worm wheel;

an electric motor coupled to the reduction mechanism; and a control circuit which drivingly controls the electric motor, wherein the worm wheel according to claim 1 is used as the worm wheel of the reduction mechanism, and the worm shaft is disposed such that a rotation axis of the worm shaft is inclined relative to a plane perpendicular to a rotation axis of the worm wheel to make an acute angle therebetween.

In a fifth aspect of the present invention, there is provided a method of forming a worm wheel, comprising:

a first step of forming an annular worm wheel main body and a primary teeth portion on an outer periphery of the worm wheel main body from a resin material by injection molding, the primary teeth portion having a plurality of primary teeth disposed in a circumferential direction of the worm wheel main body, the plurality of primary teeth including primary tooth flanks, a primary tooth crest disposed on an outer peripheral surface of the respective primary teeth, and a primary tooth bottom disposed between respective adjacent pairs of the primary tooth flanks which face each other in the circumferential direction of the worm wheel main body, and a second step of cutting a predetermined portion of the respective primary tooth flanks formed in the first step by a hob to thereby provide a plurality of secondary teeth comprising secondary tooth flanks which are brought into meshing engagement with a worm shaft, a secondary tooth crest disposed on an outer peripheral surface of the respective secondary teeth, and a secondary tooth bottom disposed between respective adjacent pairs of the secondary tooth flanks which face each other in the circumferential direction of the worm wheel main body, the respective secondary tooth flanks comprising a cutting region formed by the cutting by the hob and a non-cutting region provided in a remaining portion of the respective secondary tooth flanks exclusive of the cutting region which is not formed by the cutting by the hob, the noncutting region being located offset from a mid-position of a whole depth of the respective secondary teeth in a radially outward direction of the worm wheel main body.

The other objects and features of this invention will become understood from the following description with reference to the accompanying drawings.

BRIEF DESCRIPTION OF THE DRAWINGS

FIG. 10 is a diagram showing a comparison between a shape of a primary teeth portion of the worm wheel according to the first embodiment and a shape of a primary teeth portion of a comparative example.

DETAILED DESCRIPTION OF THE INVENTION

A worm wheel, a power steering apparatus with the worm wheel and a method of forming the worm wheel, according to embodiments of the present invention are explained hereinafter with reference to the accompanying drawings.

The following embodiments are appropriate to meet various needs, one of which is suppression of expansion of voids toward a tooth crest of the worm wheel. The following embodiments are also appropriate to meet needs to improve tooth strength and grease lubrication property and facilitate the work of taking the worm wheel out of a mold.

Figure 1:
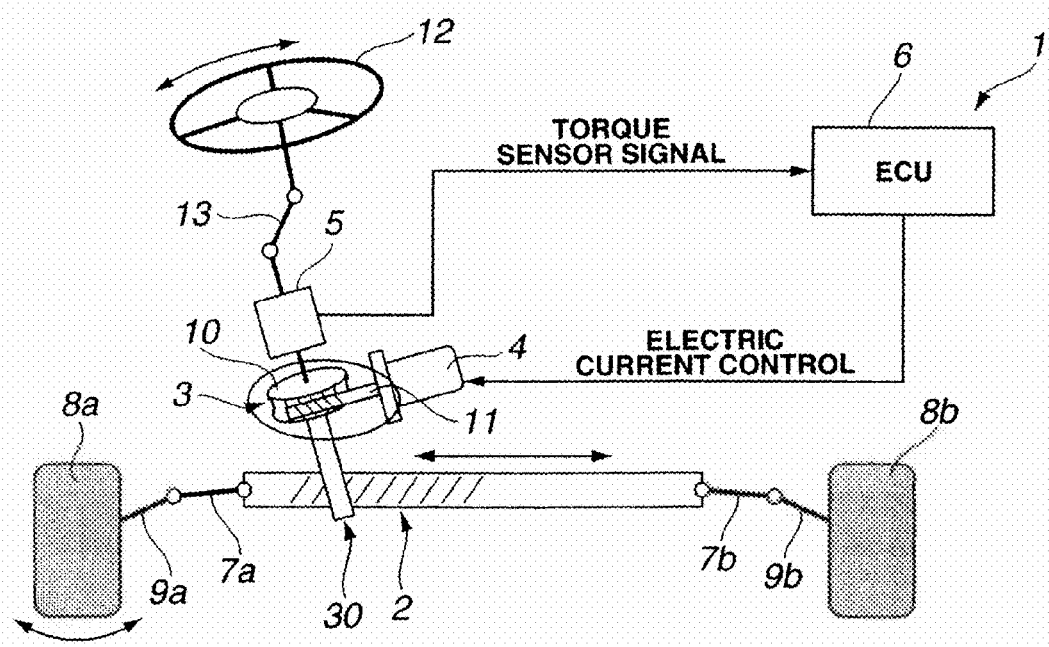
FIG. 1 is a schematic diagram showing a construction of an electric power steering apparatus with a worm gear mechanism including a worm wheel according to a first embodiment of the present invention.

FIG. 1 illustrate a construction of an electric power steering apparatus with a worm wheel according to a first embodiment of the present invention. As shown in FIG. 1, electric power steering apparatus 1 includes rack and pinion steering gear (steering mechanism) 2, 30, worm gear mechanism (reduction mechanism) 3, electric motor 4, torque sensor 5 and control unit (control circuit) 6. Rack and pinion steering gear 2 is coupled to knuckle arms 9a, 9b of left and right front steerable road wheels 8a, 8b via tie rods 7a, 7b. Worm gear mechanism 3 is constituted of worm wheel 10 and worm shaft 11 which mesh with each other. Worm wheel 10 is coupled to pinion gear 30 via steering shaft 13 connected with steering wheel 12. Worm shaft 11 is coupled to electric motor 4.

Figure 2A:
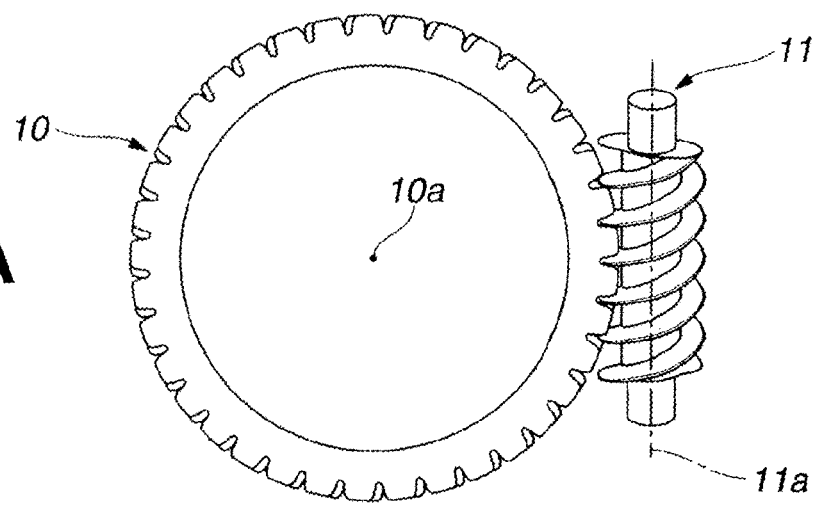
FIG. 2A to FIG. 2C are diagrams showing an arrangement of a worm shaft relative to the worm wheel in the worm gear mechanism as shown in FIG. 1.
Figure 2B:
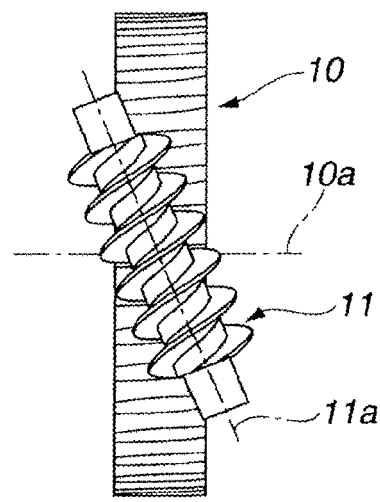
Figure 2C:
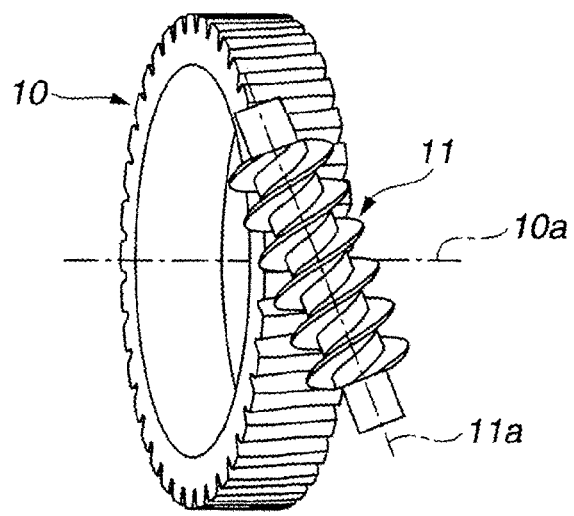

As shown in FIG. 2A to FIG. 2C, in the first embodiment, worm shaft 11 is disposed such that rotation axis 11a thereof intersects with a plane perpendicular to rotation axis 10a of worm wheel 10 to make an acute angle there between.

Referring back to FIG. 1, electric motor 4 is drivingly controlled by control unit 6 and outputs assist torque which assists a steering force applied by a vehicle driver, to steering shaft 13 via worm gear mechanism 3. Torque sensor 5 is disposed on the side of steering wheel 12 relative to worm gear mechanism 3 and detects torsion of steering shaft 13 as the steering torque applied by the vehicle driver.

Control unit 6 sets a target value of the assist torque in accordance with a torque sensor signal outputted from torque sensor 5 and controls an electric current to be supplied to electric motor 4 such that an output torque from electric motor 4 becomes equal to the target value of the assist torque. The target value of the assist torque may also be set in accordance with vehicle speed, steering velocity of steering wheel 12 and the like in addition to the torque sensor signal.

[Worm Wheel]

Figure 3:
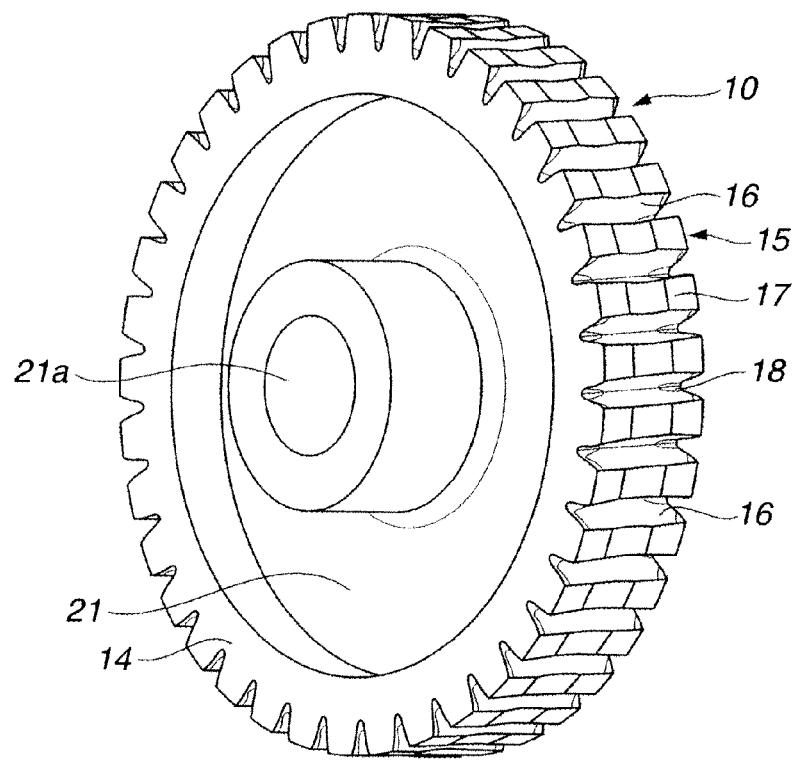
FIG. 3 is a perspective view of the worm wheel according to the first embodiment.

FIG. 3 is a perspective view of worm wheel 10 according to the first embodiment. Worm wheel 10 includes generally disk-shaped core metal 21, annular worm wheel main body 14 disposed in an outer periphery of core metal 21, and a teeth portion which is disposed in an outer periphery of worm wheel main body 14 and provided with a plurality of teeth 15. Core metal 21 is provided with through hole 21a through which pinion gear 30 extends.

Worm wheel 10 is formed from a resin material by insert injecting molding using a mold with core metal 21 as an insert to thereby provide a preformed worm wheel having worm wheel main body 14 and rough teeth on the outer periphery of worm wheel main body 14. Subsequently, the preformed worm wheel is subjected to cutting to form the rough teeth into a plurality of teeth 15. The worm wheel 10 is thus obtained. The term "hob" means a cutting tool as a kind of a cutter which has multiple cutting blades helically arranged on an outer periphery of a cylinder member. The hob is attached to a machine tool, i.e., a so-called hobbing machine and rotated to perform gear cutting for various kinds of gears, for instance, a spur gear, a helical gear and a worm gear.

Teeth 15 are arranged at a predetermined pitch in a circumferential direction of worm wheel main body 14. Teeth 15 include pairs of tooth flanks 16, 16 which face each other in the circumferential direction of worm wheel main body 14 and come into meshing engagement with worm shaft 11, tooth crest 17 disposed on an outer peripheral surface of respective teeth 15, and tooth bottom 18 disposed between respective pairs of tooth flanks 16, 16.

Figure 4:
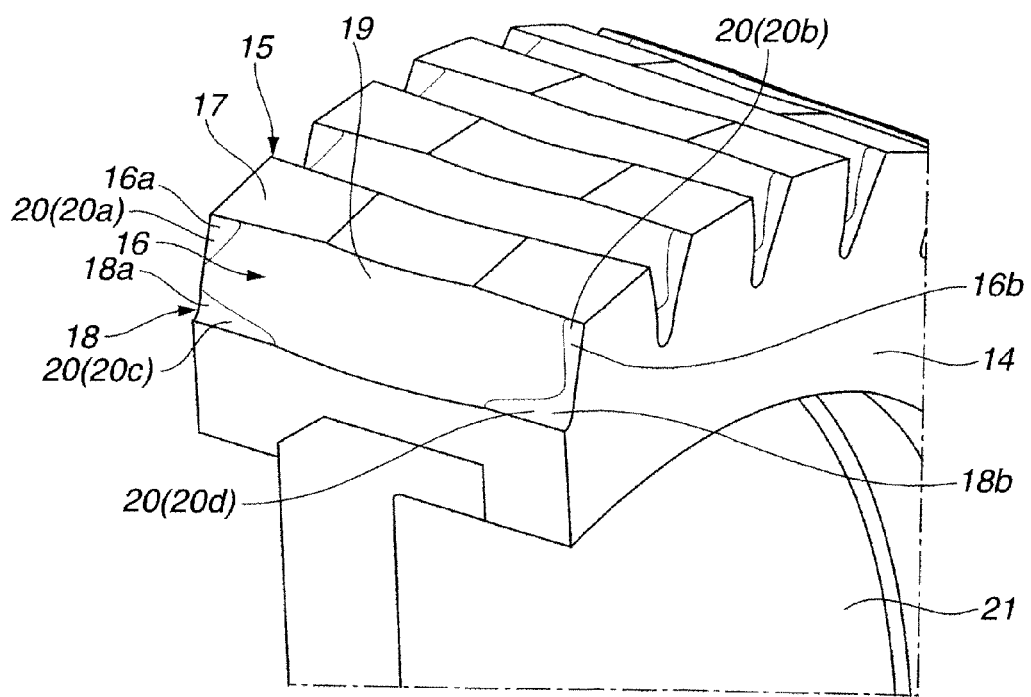
FIG. 4 is a perspective view of teeth of the worm wheel according to the first embodiment.

FIG. 4 is a perspective view of teeth 15 according to the first embodiment. As shown in FIG. 4, teeth 15 include cutting region 19 formed by cutting with a hob after completion of injection molding, and non-cutting region 20 which is not formed by cutting with the hob after completion of injection molding.

Non-cutting region 20 includes first non-cutting region 20a, second non-cutting region 20b, third non-cutting region 20c and fourth non-cutting region 20d. First non-cutting region 20a is provided in one end portion 16a of tooth flank 16 in an axial direction of worm wheel main body 14 (i.e., in an axial direction of worm wheel 10) which is located at an end portion on a side of tooth crest 17 in a radially outward direction of worm wheel main body 14 (i.e., in a radially outward direction of worm wheel 10). First non-cutting region 20a is provided outwardly offset from a mid-position of a whole depth of respective teeth 15 in the radial direction of worm wheel main body 14. The whole depth extends between tooth crest 17 and tooth bottom 18 of respective teeth 15. Second non-cutting region 20b is provided in the other end portion 16b of tooth flank 16 in the axial direction of worm wheel main body 14 which is located at an end portion on a side of tooth crest 17 in the radially outward direction of worm wheel main body 14. Second non-cutting region 20b is provided outwardly offset from the mid-position of a whole depth of respective teeth 15 in the radial direction of worm wheel main body 14. That is, first and second non-cutting regions 20a and 20b are provided on an outside of a ½ depth circle which is a circle having a radius of a half of the whole depth of respective teeth 15, i.e., on the side of tooth crest 17. More specifically, first and second non-cutting regions 20a and 20b are provided in a portion of tooth flank 16 which is located on a radial outside of a circumference of a pitch circle of tooth flank 16.

Third non-cutting region 20c is provided in one end portion 18a of tooth bottom 18 in the axial direction of worm wheel main body 14 (i.e., in the axial direction of worm wheel 10). Fourth non-cutting region 20d is provided in the other end portion 18b of tooth bottom 18 in the axial direction of worm wheel main body 14. Fourth non-cutting region 20d and second non-cutting region 20b are continuously connected with each other. That is, non-cutting region 20 extends over the whole depth of respective teeth 15 on the other end portion 16b of tooth flank 16.

In the following explanation, the four non-cutting regions 20a to 20d are collectively indicated by non-cutting region 20 unless it is necessary to distinguish them from each other.

Both end portions 18a, 18b of tooth bottom 18 at which third and fourth non-cutting regions 20c, 20d are provided are formed into a shape parallel with rotation axis 10a of worm wheel 10.

Further, a predetermined clearance is formed between first and second non-cutting regions 20a, 20b and worm shaft 11 when worm wheel 10 and worm shaft 11 are in meshing engagement with each other. The term "clearance" used herein means a distance between worm shaft 11 and first and second non-cutting regions 20a, 20b which is larger than a distance between worm shaft 11 and both end portions 16a, 16b of tooth flank 16 which is formed in a case where non-cutting region 20 is not provided in both end portions 16a, 16b, that is, in a case where cutting region 19 extends between both end portions 16a, 16b.

[Method of Forming Worm Wheel]

Figure 6:
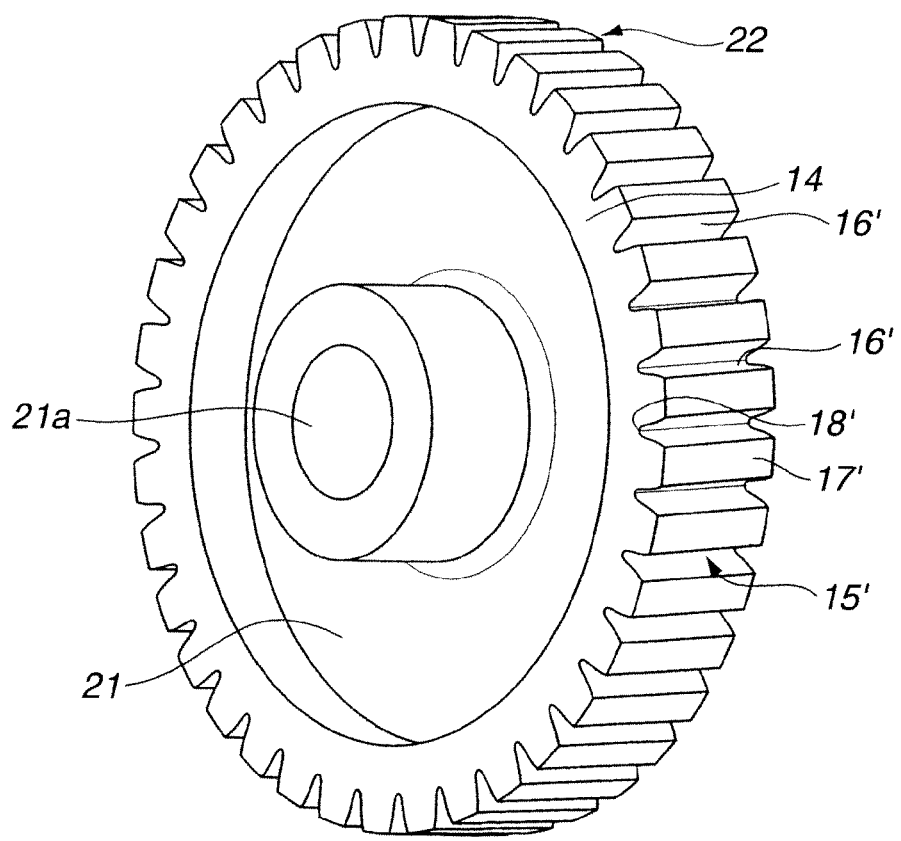
FIG. 6 is a perspective view of a preformed worm wheel obtained upon completion of a first step of the method of forming the worm wheel according to the first embodiment.

A method of forming worm wheel 10 according to the first embodiment includes a first step and a second step. In the first step, a resin material is injected into a mold in which a core metal as an insert is set. Thus, in the first step, a preformed worm wheel is formed from the resin material by insert injection molding. The preformed worm wheel includes annular worm wheel main body 14 and primary teeth portion 22 disposed on the outer periphery of worm wheel main body 14. Primary teeth portion 22 has a plurality of rough primary teeth 15' disposed in a circumferential direction of worm wheel main body 14. FIG. 6 is a perspective view of the preformed worm wheel obtained upon completion of the first step. Primary teeth portion 22 of the preformed worm wheel is subjected to gear cutting by a hob in the second step subsequent to the first step. Therefore, rough primary teeth 15' of primary teeth portion 22 which include primary tooth flank 16', primary tooth crest 17' and primary tooth bottom 18' have a shape different from the shape of teeth 15 of worm wheel 10 which includes tooth flank 16, tooth crest 17 and tooth bottom 18.

Figure 7:
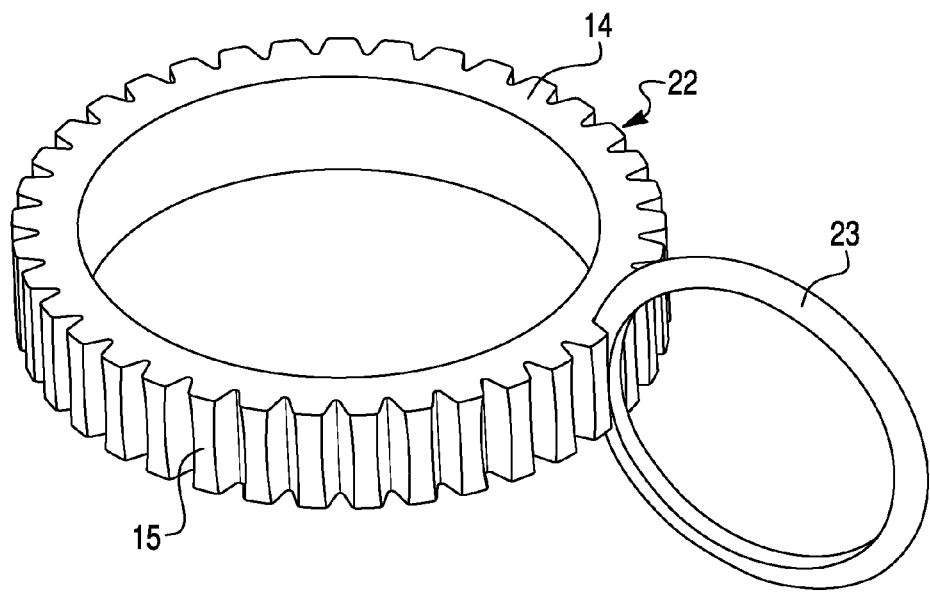
FIG. 7 is a diagram showing a second step of the method of forming the worm wheel according to the first embodiment.

Next, in the second step as shown in FIG. 7, primary teeth portion 22 is subjected to gear cutting by hob 23 to form the shape of primary teeth 15' into the shape of teeth 15 finally obtained. Specifically, in the second step, primary tooth flank 16' and primary tooth bottom 18' of primary teeth 15' are subjected to gear cutting by hob 23. Upon completion of the second step, there are provided tooth flank 16 and tooth bottom 18 which have cutting region 19 formed by cutting by hob 23 and non-cutting region 20 not formed by cutting by hob 23. Thus, the shapes of tooth flank 16 and tooth bottom 18 is formed by the second step. Upon subjecting primary teeth portion 22 to gear cutting by hob 23, hob 23 is moved only in a radial direction of primary teeth portion 22 to thereby provide cutting region 19. At this time, if hob 23 is moved in an axial direction of primary teeth portion 22, portions of primary tooth flank 16' and primary tooth bottom 18' which are to become non-cutting region 20 of teeth 15 will be cut. Therefore, in such a case, worm wheel 10 having teeth 15 with non-cutting region 20 cannot be formed. Accordingly, by moving hob 23 only in the radial direction of primary teeth portion 22, the resulting cutting region 19 having a desired shape can be provided and at the same time, the resulting non-cutting region 20 as a remaining region can be provided.

Meanwhile, primary teeth portion 22 is formed smaller (or thinner) than a primary teeth portion of a conventional worm wheel in which an entire portion of the primary teeth portion is subjected to cutting, to such an extent that a region to be non-cutting region 20 is free from cutting.

The worm wheel and the method of forming the worm wheel have the following functions.

[Improvement in Strength of Teeth]

A conventional worm wheel made of a resin material is formed through insert injection molding and then gear cutting by a hob. Specifically, a resin material is injected into a cavity of a mold in which a generally disk-shaped metal core as an insert is set, so that a rim is formed on an outer periphery of the metal core. Subsequently, an outer peripheral surface of the rim is subjected to gear cutting with a hob to form a primary teeth portion. The outer peripheral surface of the rim is cooled, cured and shrunk earlier than an inside of the rim during the cooling after completion of the injection molding. Therefore, an inner region on the inside of the rim which is not yet cured is pulled by an outer region on the side of the outer peripheral surface of the rim which has been previously cooled and cured. As a result, a microstructure of the inner region becomes rough so that so-called voids will be generated in the microstructure of the inner region.

Figure 8:
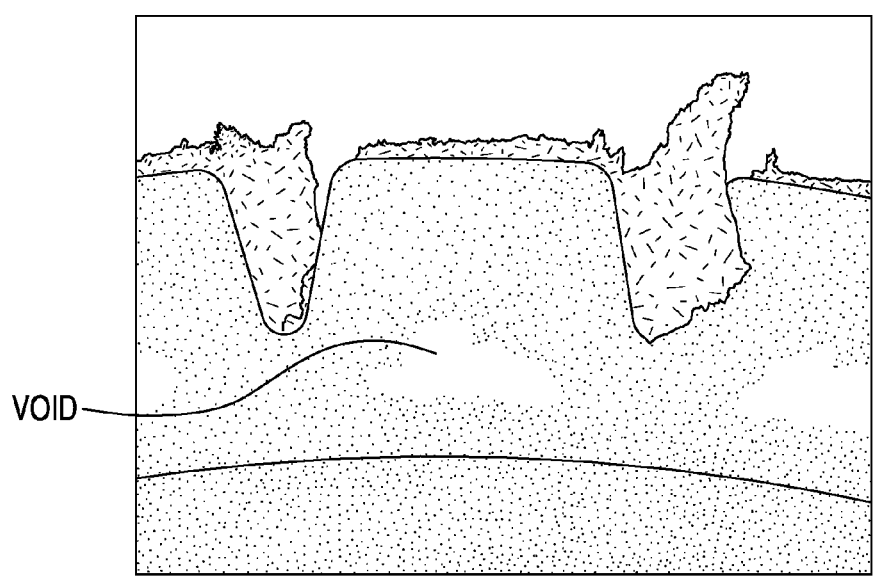
FIG. 8 is an enlarged diagram showing void generating positions of the worm wheel according to the first embodiment.
Figure 9:
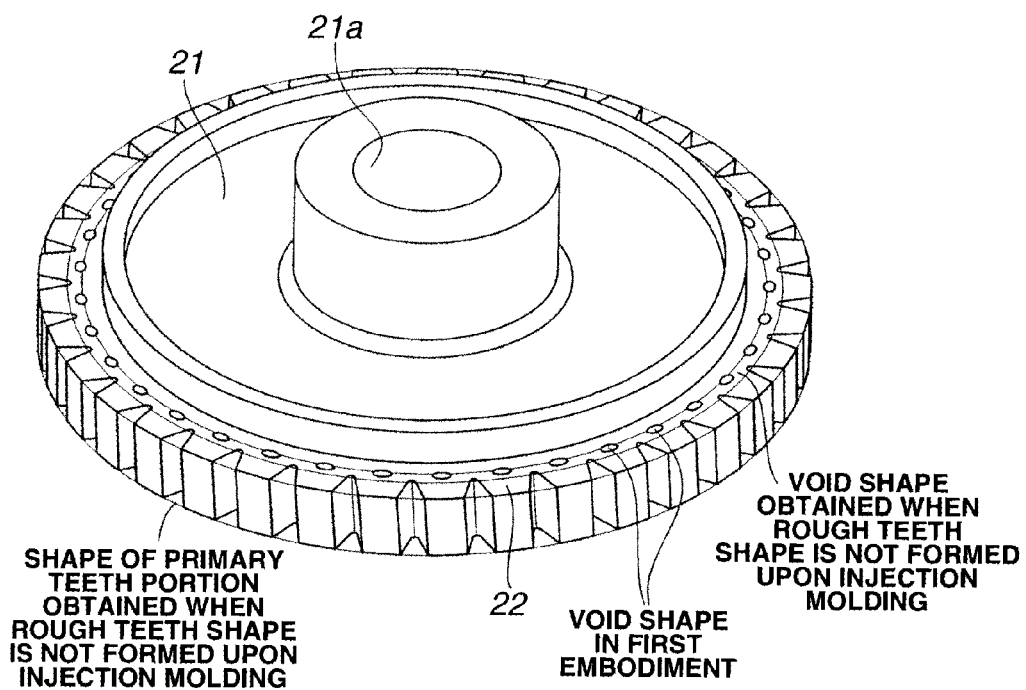
FIG. 9 is a diagram showing a comparison between a void generating position of the worm wheel according to the first embodiment and a void generating position of a worm wheel according to a comparative example in which a rough shape of teeth is not formed in the injection molding step.

In contrast, in the method of forming the worm wheel according to the first embodiment, in the first step, a preformed worm wheel including core metal 21, worm wheel main body 14 and primary teeth portion 22 with roughly shaped teeth 15' are formed by insert injection molding, and then in the second step, rough tooth flank 16' of roughly shaped teeth 15' is formed into tooth flank 16 having a final surface shape by using hob 23. Since primary teeth portion 22 is previously formed on the outer periphery of worm wheel main body 14 in the first step, void generation can be limited to a radial inside position of the respective tooth crests as shown in FIG. 8. FIG. 9 is a diagram showing a comparison between a void generating position of worm wheel 10 according to the first embodiment and a void generating position of a worm wheel according to a comparative example in which a rough shape of teeth is not formed upon injection molding. In the comparative example, voids are generated along an annular portion spaced by a constant distance from an outer circumferential surface of the worm wheel. On the other hand, in worm wheel 10 according to the first embodiment, void generation is limited only to narrow radial inside positions of the respective tooth crests. Accordingly, in the method of forming a worm wheel according to the first embodiment, void generation can be suppressed as compared to the comparative example, thereby resulting in improvement in strength of teeth of the worm wheel.

Further, in the method of forming a worm wheel according to the first embodiment, in the first step, primary teeth portion 22 is formed smaller than in a case where an entire portion of the primary teeth portion is cut by a hob, in order to prevent portions corresponding to non-cutting region 20 of worm wheel 10 from being cut by hob 23 upon gear cutting in the second step. As a result, roughly shaped teeth 15' of primary teeth portion 22 obtained upon completion of the first step can be thinned as compared to the case where an entire portion of the primary teeth portion is cut by a hob. Therefore, it is possible to suppress occurrence of temperature unevenness during cooling, curing and shrinking of roughly shaped teeth 15' made of a resin material and thereby suppress generation of voids. Further, with the provision of non-cutting region 20 on tooth flank 16 which is free from cutting by hob 23, even in a case where voids are present inside of teeth 15, a distance from an outer surface of respective teeth 15 to the voids can be kept after the injection molding without change with time. That is, as compared to the case where any non-cutting region is not provided, the distance from the outer peripheral surface of respective teeth to the void generating position can be increased.

FIG. 10 is a diagram showing a comparison between a shape of the primary teeth portion of worm wheel 10 according to the first embodiment and a shape of a primary teeth portion of the conventional worm wheel as a comparative example in which an entire portion of the primary teeth portion is subjected to gear cutting. In FIG. 10, for the sake of simple illustration, a voids generating position is indicated by a void generating point. In FIG. 10, a1 denotes a distance between a tooth bottom and a void generating point in the conventional worm wheel, b1 denotes a distance between tooth bottom 18' and a void generating point in worm wheel 10 according to the first embodiment, a2 denotes a distance between a tooth flank and the void generating point in the conventional worm wheel, and b2 denotes a distance between tooth flank 16' and the void generating point in worm wheel 10 according to the first embodiment. As shown in FIG. 10, in the first embodiment in which non-cutting region 20 remains on tooth flank 16 without being cut, the voids generating point is located further inwardly in the radial direction of worm wheel 10 than the void generating point in the conventional worm wheel (i.e., b1>a1, b2>a2). That is, in the first embodiment, a distance between the outer peripheral surface of the respective teeth and the void generating point can be increased, resulting in enhancing strength of the teeth.

Figure 5:
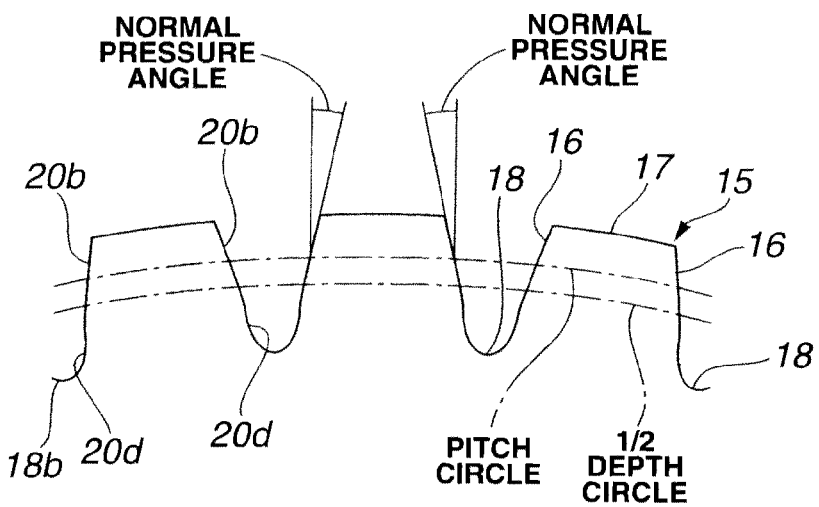
FIG. 5 is a side view of the teeth of the worm wheel according to the first embodiment.

Further, in the first embodiment, as shown in FIG. 5, first and second non-cutting regions 20a and 20b are provided in a portion of tooth flank 16 which is located outwardly offset from a mid-position of the whole depth of respective teeth 15 in the radial direction of worm wheel main body 14. As a result, expansion of voids toward the side of tooth crest can be suppressed. A worm wheel made of resin, such as worm wheel 10 according to the first embodiment, undergoes a force which is applied from the worm shaft so as to flex the teeth of the worm wheel during torque transmission through mutually meshing portions of the worm wheel and the worm shaft. Particularly, a large amount of displacement of the respective teeth is caused due to the flexure becomes larger on the side of tooth crest 17, and therefore, an increased strength of the respective teeth on the side of tooth crest 17 is required. Accordingly, suppression of void generation on the side of tooth crest 17 in the first embodiment can fulfill the specific requirements for properties of the worm wheel made of resin.

Further, in the first embodiment, first and second non-cutting regions 20a and 20b are provided in a portion of tooth flank 16 which is located on a radial outside of a pitch circle. Mutually meshing portions of worm wheel 10 and worm shaft 11 are substantially located on the pitch circle onto which such a force as to flex teeth 15 is applied from worm shaft 11 upon torque transmission through the mutually meshing portions. With the provision of first and second non-cutting regions 20a and 20b on the tooth crest side located on a radial outside of the pitch circle in the first embodiment, it is possible to improve strength of teeth 15 against the flexure which is caused upon the torque transmission.

Furthermore, in the first embodiment, first and second non-cutting regions 20a and 20b are also provided on a circumference of a pitch circle. Mutually meshing portions of worm wheel 10 and worm shaft 11 are substantially located on the circumference of the pitch circle onto which such a force as to flex teeth 15 is applied from worm shaft 11 upon torque transmission. With the provision of first and second non-cutting regions 20a and 20b on the circumference of the pitch circle in the first embodiment, it is possible to improve strength of teeth 15 against the force which is applied from worm shaft 11.

Further, in the first embodiment, third and fourth non-cutting regions 20c, 20d are provided in both end portions 18a, 18b of tooth bottom 18 in the axial direction of worm wheel main body 14. As shown in FIG. 8, there is such a tendency that the voids are generated to a largest extent between adjacent tooth bottoms 18, 18. Therefore, with the provision of third and fourth non-cutting regions 20c, 20d at both end portions 18a, 18b of tooth bottom 18 in the axial direction of worm wheel main body 14, it is possible to suppress generation of the voids between adjacent tooth bottoms 18, 18 and thereby increase strength on the tooth root side of respective teeth 15.

Further, in the first embodiment, second and fourth non-cutting regions 20b, 20d are continuously connected with each other. That is, the non-cutting region extends over the whole depth of respective teeth 15. As a result, it is possible to suppress void generation in end portions 16b and 18b over the whole depth of respective teeth 15.

Furthermore, in the first embodiment, the shapes of both end portions 18a, 18b of tooth bottom 18 in the axial direction of worm wheel main body 14 in which third and fourth non-cutting regions 20c, 20d are provided are formed to be parallel with rotation axis 10a of worm wheel 10. In a case where cutting region 19 is provided to extend between both end portions 18a, 18b of tooth bottom 18, the angle formed between an axial end surface of worm wheel main body 14 and both end portions 18a, 18b of tooth bottom 18 and will become an acute angle. The reason why the acute angle is formed is that tooth bottom 18 cut by hob 23 has a concaved arc shape in a sectional view. In the first embodiment, since the shapes of both end portions 18a, 18b of tooth bottom 18 in which third and fourth non-cutting regions 20c, 20d are provided are formed to be parallel with rotation axis 10a of worm wheel 10, the angle formed between the axial end surface of worm wheel main body 14 and both end portions 18a, 18b of tooth bottom 18 becomes about 90 degrees. As a result, it is possible to improve the strength at both end portions 18a, 18b of tooth bottom 18 or reduce stress concentration thereon.

[Improvement Grease Lubrication]

Figure 11A:
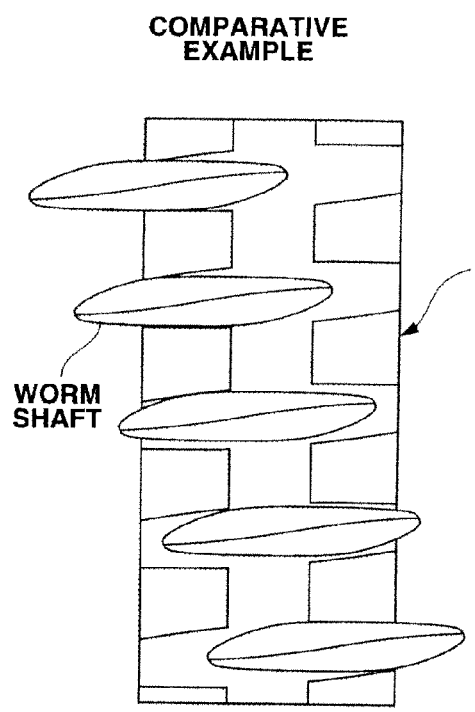
FIG. 11A and FIG. 11B are explanatory diagrams showing an effect of enhancing grease lubrication property of the worm wheel according to the first embodiment as compared to a comparative example.
Figure 11B:
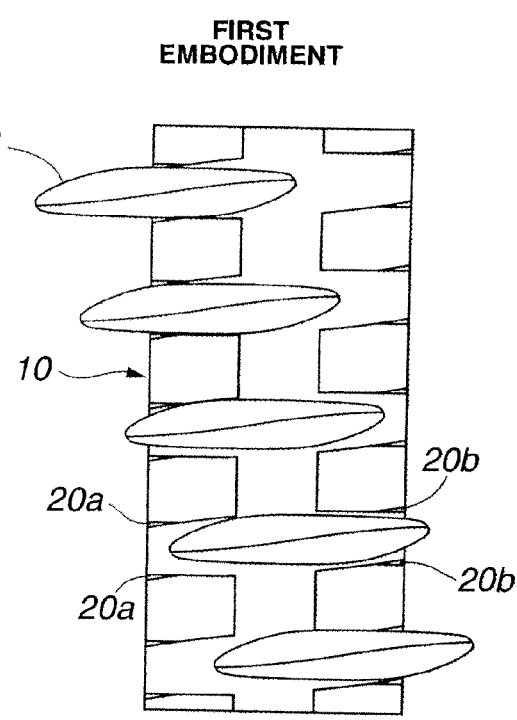

In the first embodiment, first and second non-cutting regions 20a, 20b are provided in both end portions 16a, 16b of tooth flank 16 in the axial direction of worm wheel main body 14. For this reason, a clearance between both end portions 16a, 16b of tooth flank 16 of worm wheel 10 and a tooth flank of worm shaft 11 in the circumferential direction of worm wheel 10 is increased as shown in FIG. 11B, as compared to the conventional worm wheel as a comparative example in which a cutting region on the tooth flank extends between both end portions of the tooth flank in the axial direction of the worm wheel without change in shape as shown in FIG. 11A. The clearance serves as a grease trap to thereby enhance grease lubrication between the tooth flanks of worm wheel 10 and worm shaft 11 and increase durability of worm gear mechanism 3.

[Facilitated Taking-Out Work]

In the first embodiment, worm shaft 11 is disposed such that rotation axis 11a of worm shaft 11 intersects with a plane perpendicular to rotation axis 10a of worm wheel 10 to make an acute angle there between. That is, worm shaft 11 meshes with worm wheel 10 in an inclined state. With this arrangement of worm shaft 11, an inclination of teeth 15 of worm wheel 10 (i.e., an inclination angle of a direction of a tooth trace of respective teeth 15 with respect to rotation axis 10a of worm wheel 10) can be reduced. Accordingly, an undercut of worm wheel 10 can be decreased to thereby facilitate the work of taking out worm wheel 10 from the mold in the injection molding step.

The first embodiment can attain the following effects.

(1) Worm wheel 10 according to the first embodiment includes annular worm wheel main body 14 formed from a resin material by injection molding, a plurality of teeth 15 disposed on an outer periphery of worm wheel main body 14 in a circumferential direction of worm wheel main body 14, the plurality of teeth 15 including tooth flanks 16 which are brought into meshing engagement with worm shaft 11, tooth crest 17 disposed on an outer peripheral surface of respective teeth 15, and tooth bottom 18 disposed between respective adjacent pairs of tooth flanks 16, 16 which face each other in the circumferential direction of worm wheel main body 14, wherein first and second non-cutting regions 20a, 20b are provided on respective tooth flanks 16 and located offset from a mid-position of a whole depth of respective teeth 15 in a radially outward direction of worm wheel main body 14, the first and second non-cutting regions 20a, 20b being not formed by cutting by hob 23 after completion of the injection molding, and cutting region 19 is provided on respective tooth flanks 16, the cutting region 19 being formed by cutting by hob 23 after completion of the injection molding. With this construction, expansion of voids toward the tooth crest side can be suppressed to thereby enhance the strength on the tooth crest side which is necessitated to be larger than that on the tooth root side upon torque transmission through intermeshing between worm wheel 10 and worm shaft 11.

(2) There is such a tendency that voids are generated between adjacent tooth bottoms 18, 18 to a largest extent during injection molding. With the provision of third and fourth non-cutting regions 20c, 20d in both end portions 18a, 18b of tooth bottom 18 in an axial direction of worm wheel main body 14, it is possible to suppress generation of voids between adjacent tooth bottoms 18, 18 and therefore enhance the strength on the tooth root side.

(3) Worm wheel 10 includes annular worm wheel main body 14 formed from a resin material by injection molding and a plurality of teeth 15 disposed on an outer periphery of worm wheel main body 14 in a circumferential direction of worm wheel main body 14, the plurality of teeth 15 including tooth flanks 16 which are brought into meshing engagement with worm shaft 11, tooth crest 17 disposed on an outer peripheral surface of respective teeth 15, and tooth bottom 18 disposed between respective pairs of tooth flanks 16, 16 which face each other in the circumferential direction of worm wheel main body 14, wherein first and second non-cutting regions 20a, 20b are provided on both end portions of respective tooth flanks 16 in an axial direction of worm wheel main body 14 which are located at an end on the side of tooth crest 17, the first and second non-cutting regions 20a, 20b not formed by cutting by hob 23 after completion of the injection molding, and cutting region 19 are provided on tooth flank 16, the cutting region 19 being formed by cutting by hob 23 after completion of the injection molding. With this construction, expansion of voids toward the tooth crest side can be suppressed to thereby enhance the strength on the tooth crest side for which a necessity for enhancement of the strength is larger than that on the tooth root side upon torque transmission through intermeshing between worm wheel 10 and worm shaft 11.

(4) Electric power steering apparatus 1 includes rack and pinion steering mechanism 2 coupled to left and right front steerable road wheels 8a, 8b, worm gear mechanism 3 which is coupled to rack and pinion steering mechanism 2 and includes a worm wheel and worm shaft 11 meshing with the worm wheel, electric motor 4 coupled to worm gear mechanism 3, and control unit 6 which drivingly controls electric motor 4, wherein worm wheel 10 according to the first embodiment is used as the worm wheel of worm gear mechanism 3, and worm shaft 11 is disposed such that rotation axis 11a of worm shaft 11 is inclined relative to a plane perpendicular to rotation axis 10a of worm wheel 10 to make an acute angle there between. With this arrangement, an inclination of respective teeth 15 of worm wheel 10 (i.e., an inclination angle of a direction of a tooth trace of respective teeth 15 with respect to rotation axis 10a of worm wheel 10) can be reduced. As a result, an undercut of worm wheel 10 can be decreased to thereby facilitate the work of taking out worm wheel 10 from the mold in the injection molding step.

(5) The method of forming worm wheel 10 according to the first embodiment includes a first step of forming annular worm wheel main body 14 and primary teeth portion 22 on an outer periphery of worm wheel main body 14 from a resin material by injection molding, primary teeth portion 22 having a plurality of primary teeth 15' disposed in a circumferential direction of worm wheel main body 14, the plurality of primary teeth 15' including primary tooth flanks 16', primary tooth crest 17' disposed on an outer peripheral surface of respective primary teeth 15', and primary tooth bottom 18' disposed between respective adjacent pairs of primary tooth flanks 16', 16' which face each other in the circumferential direction of worm wheel main body 14, and a second step of cutting a predetermined portion of respective primary tooth flanks 16' formed in the first step by hob 23 to thereby provide a plurality of secondary teeth 15 including secondary tooth flanks 16 which are brought into meshing engagement with worm shaft 11, secondary tooth crest 17 disposed on an outer peripheral surface of respective secondary teeth 15, and secondary tooth bottom 18 disposed between respective adjacent pairs of secondary tooth flanks 16 which face each other in the circumferential direction of worm wheel main body 14, the respective secondary tooth flanks 16 including cutting region 19 formed by the cutting by hob 23, and non-cutting regions 20a, 20b provided in a remaining portion of respective secondary tooth flanks 16 exclusive of cutting region 19 which is not formed by the cutting by hob 23, the non-cutting region 20a, 20b being located offset from a mid-position of a whole depth of respective secondary teeth 15 in a radially outward direction of worm wheel main body 14.

By the method according to the first embodiment, expansion of voids toward the tooth crest side can be suppressed to thereby enhance the strength on the tooth crest side for which a necessity for enhancement of the strength is larger than that on the tooth root side upon torque transmission through intermeshing between worm wheel 10 and worm shaft 11.

Figure 12A:
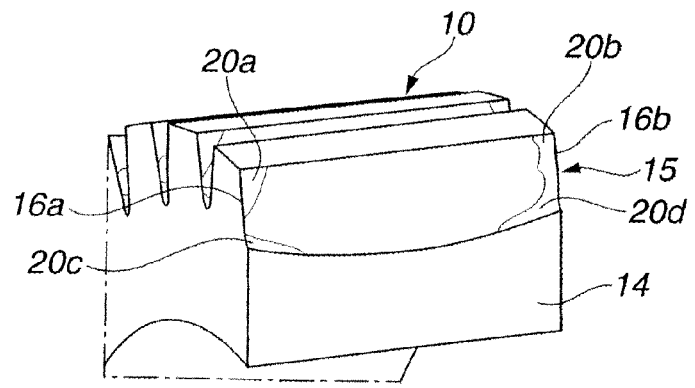
FIG. 12A to FIG. 12C are diagrams showing a second step of the method of forming a worm wheel according to a second embodiment.
Figure 12B:
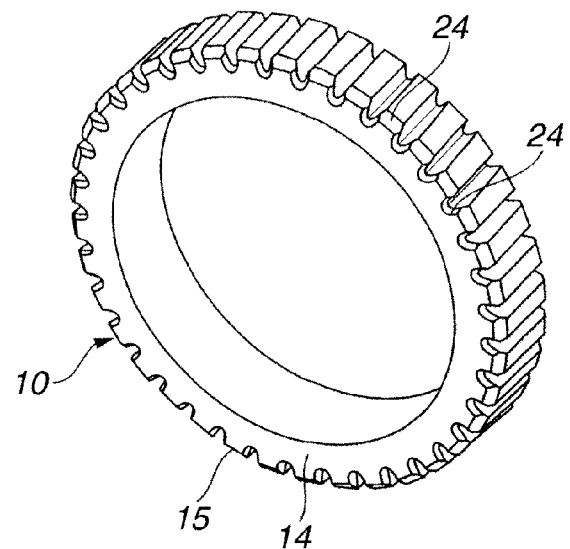
Figure 12C:
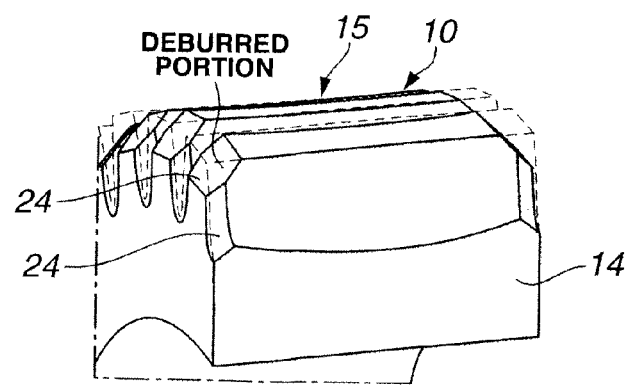

Referring to FIG. 12A to FIG. 12C, the method of forming a worm wheel according to a second embodiment of the present invention will be explained. The second embodiment differs from the first embodiment in that a third step of removing burr generated on the worm wheel in the second step of cutting by the hob is added thereto. Like reference numerals denote like parts, and therefore, detailed explanations therefore are omitted.

The method of forming a worm wheel according to the second embodiment includes the first and second steps which are the same as explained above and the third step of removing flash generated on both end portions 16a, 16b of tooth flank 16 in the axial direction of worm wheel main body 14 after completion of the second step. FIG. 12A is an enlarged perspective view of worm wheel 10 upon completion of the second step, showing both end portions 16a, 16b in which burr is generated upon cutting by the hob in the second step. In the third step, both end portions 16a, 16b of tooth flank 16 is subjected to deburring. As shown in FIG. 12B and FIG. 12C, worm wheel 10 obtained upon completion of the third step is provided with deburred portions 24. Respective non-cutting regions 20a, 20b, 20c, 20d may be partially removed by the deburring.

The burr generated on worm wheel 10 by cutting in the second step is thus removed in the third step, so that worm wheel 10 can achieve smooth meshing engagement with worm shaft 11.

Meanwhile, owing to partially removing non-cutting region 20, worm wheel 10 obtained upon completion of the third step has a shape different from the shape of worm wheel 10 obtained upon completion of the second step. However, the method of forming a worm wheel according to the second embodiment can attain the following effect (6) in addition to the above-described effects of the first embodiment (such as improvement in strength of the teeth owing to suppression of void generation, facilitating the work of taking out the worm wheel from a mold in the first step, improvement in grease lubricating property upon torque transmission).

The second embodiment can attain the following effect (6).

(6) Since the method of forming a worm wheel according to the second embodiment further includes the third step of removing the burr generated on worm wheel 10 upon cutting in the second step, which is to be conducted after completion of the second step, worm wheel 10 can achieve smooth meshing engagement with worm shaft 11 to thereby enhance a power transmission efficiency.

Figure 13:
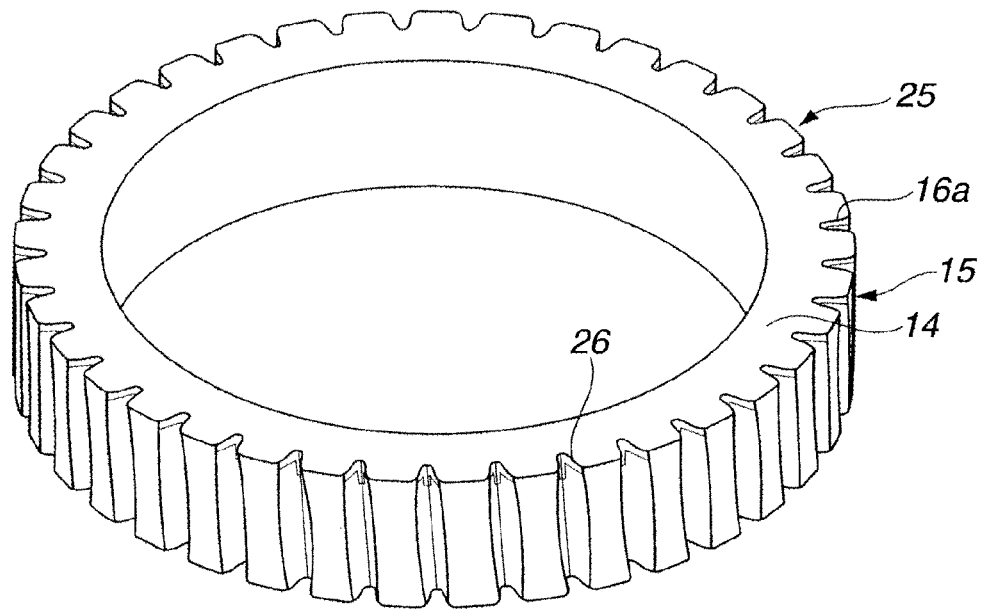
FIG. 13 is a perspective view of a worm wheel according to a third embodiment.

Referring to FIG. 13, the worm wheel according to a third embodiment of the present invention will be explained, which differs from the first embodiment in that the non-cutting region is provided only in one end of the tooth flank in the axial direction of the worm wheel. Like reference numerals denote like parts, and therefore, detailed explanations therefore are omitted.

FIG. 13 is a perspective view of worm wheel 25 according to the third embodiment. As shown in FIG. 13, worm wheel 25 includes non-cutting region 26 which is provided only in one end portion 16a of tooth flank 16 in the axial direction of worm wheel main body 14 and extends over the whole depth of respective teeth 15. One end portion 16a of tooth flank 16 is located on the side of a leading end of tooth flank 16 in a direction of meshing worm wheel 25 with worm shaft 11.

Further, in the third embodiment, one side of teeth 15 in the axial direction of worm wheel main body 14 which is not provided with non-cutting region 26 is formed into an undercut shape relative to the mold used in injection molding in the first step.

The third embodiment can attain the following functions. In the third embodiment, non-cutting region 26 is provided only in one end portion 16a of tooth flank 16 which is located on the side of a leading end of tooth flank 16 in the direction of meshing worm wheel 25 with worm shaft 11. With this arrangement, non-cutting region 26 can serve as a grease trap, thereby increasing the lubrication property of worm gear mechanism 3.

Further, by forming the undercut shape on the one side of teeth 15 in the axial direction of worm wheel main body 14 which is not provided with non-cutting region 26, it is possible to facilitate the work of taking out the preformed worm wheel from the mold while elastically deforming the preformed worm wheel upon completing the first step, as compared to the case where the undercut shape is formed on both sides of teeth 15 in the axial direction of worm wheel main body 14. Thus, the taking-out work can be readily performed.

The third embodiment can attain the following effects (7)-(8).

(7) With the provision of non-cutting region 26 only on the side of a leading end of tooth flank 16 in the direction of meshing worm wheel 25 with worm shaft 11 (i.e., only in one end portion 16a of the opposite end portions 16a, 16b), non-cutting region 26 can serve as a grease trap so that worm gear mechanism 3 can be increased in lubrication property.

(8) Only one side of teeth 15 in the axial direction of worm wheel main body 14 is provided with non-cutting region 26, and the other side of teeth 15 in the axial direction of worm wheel main body 14 is formed into the undercut shape relative to the mold used in injection molding in the first step. As a result, it is possible to facilitate the work of taking out the preformed worm wheel from the mold used in injection molding.

Figure 14:
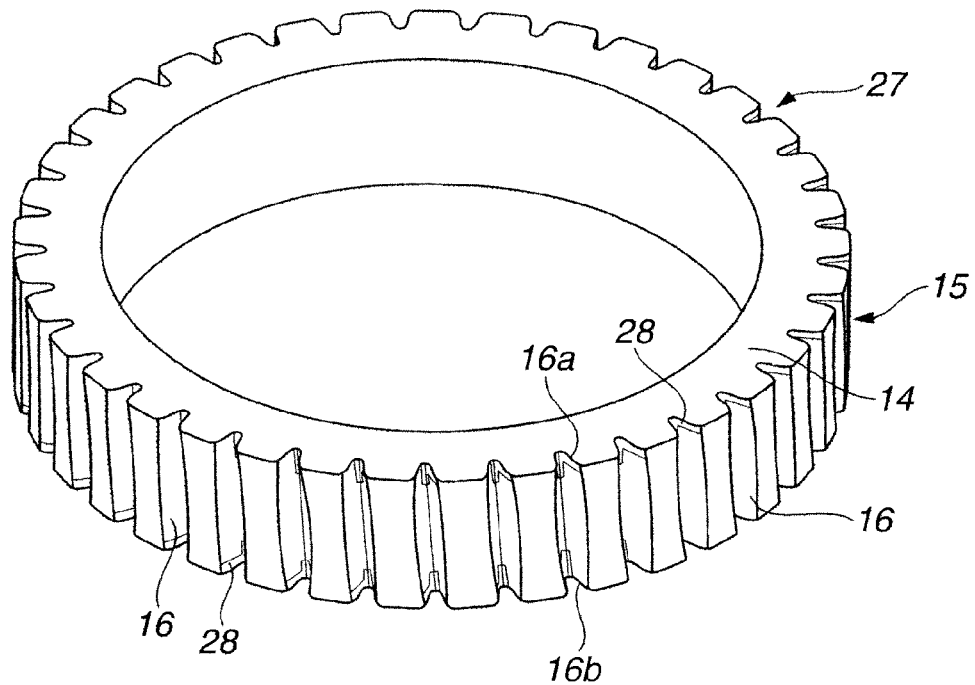
FIG. 14 is a perspective view of a worm wheel according to a fourth embodiment.

Referring to FIG. 14, the worm wheel according to a fourth embodiment of the present invention will be explained, which differs from the first embodiment in arrangement of the non-cutting region on the tooth flank. Like reference numerals denote like parts, and therefore, detailed explanations therefore are omitted.

FIG. 14 is a perspective view of worm wheel 27 according to the fourth embodiment. Worm wheel 27 includes non-cutting region 28 which is provided only on one side of each of a pair of tooth flanks 16, 16 facing to each other and extends on tooth flanks 16, 16 over the whole depth of respective teeth 15. Further, non-cutting region 28 is provided only in one of opposite end portions 16a, 16b of tooth flank 16 in the axial direction of worm wheel main body 14. That is, one of the pair of tooth flanks 16, 16 which has non-cutting region 28 on one end portion 16a is not provided with non-cutting region 28 on the other end portion 16b. In contrast, the other of the pair of tooth flanks 16, 16 which has non-cutting region 28 on the other end portion 16b is not provided with non-cutting region 28 on one end portion 16a.

In the fourth embodiment, primary teeth portion 22 of the preformed worm wheel can be formed smaller (or thinner) by an amount of non-cutting region 28 provided only on one of the opposite end portion of tooth flank 16 in the axial direction of worm wheel main body 14. As a result, similarly to the first embodiment, the fourth embodiment can attain the effect of suppressing void generation and thereby increasing a strength of teeth.

Figure 15A:
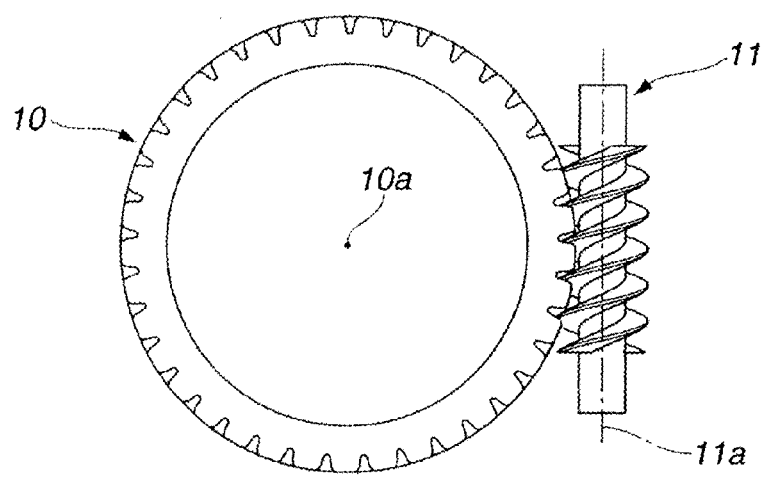
FIG. 15A to FIG. 15C are diagrams showing an arrangement of a worm shaft relative to the worm wheel according to a fifth embodiment.
Figure 15B:
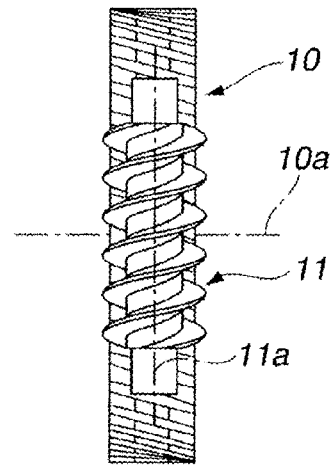
Figure 15C:
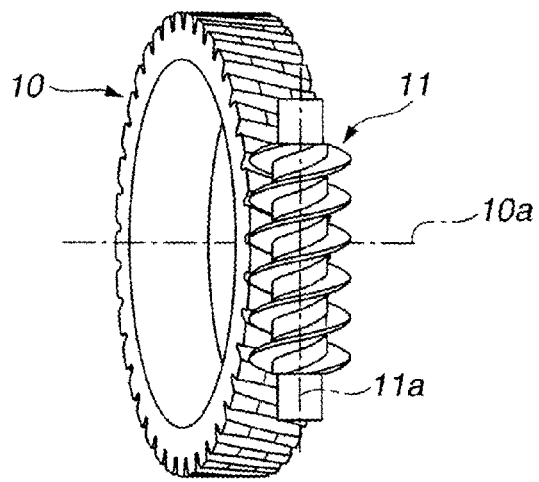

Referring to FIG. 15A to FIG. 15C, the worm wheel according to a fifth embodiment of the present invention will be explained, which differs from the first embodiment in arrangement of the worm shaft with respect to the worm wheel. Like reference numerals denote like parts, and therefore, detailed explanations therefore are omitted.

As seen from FIG. 15A to FIG. 15C, worm shaft 11 is arranged such that rotation axis 11a of worm shaft 11 is disposed in parallel with a plane perpendicular to rotation axis 10a of worm wheel 10.

With this arrangement, steering shaft 13 of worm gear mechanism 3 can be reduced in size in the axial direction thereof so that an outer contour of electric power steering apparatus 1 can become compact.

The fifth embodiment can attain the following effect (9).

(9) With the arrangement of worm shaft 11 in which rotation axis 11a of worm shaft 11 is disposed in parallel with a plane perpendicular to rotation axis 10a of worm wheel 10, it is possible to make an outer contour of electric power steering apparatus 1 compact.

Furthermore, other technical concepts and effects of the present invention which are understandable from the above embodiments are described as follows.

(a) In a sixth aspect of the present invention, there is provided the worm wheel according to the second aspect, wherein the non-cutting region is provided in both end portions of the tooth bottom in the axial direction of the worm wheel main body.

Voids tend to be generated to a largest extent between the tooth bottoms adjacent to each other. Therefore, with the provision of the non-cutting regions at the both end portions of the tooth bottom in the axial direction of the worm wheel main body, it is possible to suppress generation of the voids between the adjacent tooth bottoms and thereby increase the strength on the tooth root side of the respective teeth.

(b) In a seventh aspect of the present invention, there is provided the worm wheel according to the second aspect, wherein a shape of each end portion of the tooth bottom in which the non-cutting region is provided is formed to be parallel with the rotation axis of the worm wheel.

In a case where the cutting region is provided to extend over an entire length of the tooth bottom between the both end portions of the tooth bottom, the angle formed by the both end portions of the tooth bottom and an axial end surface of the worm wheel main body will become an acute angle. The reason why the acute angle is formed is that the tooth bottom cut by the hob has a concaved arc shape in a sectional view. In contrast, in the present invention, the both end portions of the tooth bottom at which the non-cutting regions are provided are formed to be parallel with the rotation axis of the worm wheel. Therefore, the angle formed by the both end portions of the tooth bottom and the axial end surface of the worm wheel main body becomes about 90 degrees, so that it is possible to increase in the strength at the both end portions of the tooth bottom or reduce stress concentration thereon.

(c) In an eighth aspect of the present invention, there is provided the worm wheel according to the first aspect, wherein the non-cutting region is provided in a portion of the tooth flank which is located on a radial outside of a pitch circle. Mutually meshing portions of the worm wheel and the worm shaft are substantially located on the circumference of the pitch circle onto which such a force as to flex the teeth is applied from the worm shaft upon torque transmission through the mutually meshing portions to thereby increase an amount of displacement of the portion located on the radial outside of the pitch circle (i.e., on the tooth crest side). With the provision of the non-cutting region on the radial outside of the pitch circle, it is possible to increase strength of the teeth against the flexure which is caused upon the torque transmission.

(d) In a ninth aspect of the present invention, there is provided the worm wheel according to the first aspect, wherein the non-cutting region is provided on a circumference of a pitch circle. Mutually meshing portions of the worm wheel and the worm shaft are substantially located on the circumference of the pitch circle onto which such a large force as to flex the teeth is applied from the worm shaft upon torque transmission through the mutually meshing portions. With the provision of the non-cutting region on the circumference of the pitch circle, it is possible to increase the strength of the teeth against the force which is applied from the worm shaft.

(e) In a tenth aspect of the present invention, there is provided the worm wheel according to the first aspect, wherein the non-cutting region is provided in at least one end portion of the tooth flank in the axial direction of the worm wheel main body, and when the worm wheel and the worm shaft are in meshing engagement with each other, a predetermined clearance is formed between the non-cutting region provided in the at least one end portion of the tooth flank and the worm shaft.

The term "clearance" used herein means a distance between the worm shaft and the non-cutting region which is larger than a distance between the worm shaft and an end portion of the tooth flank which is formed in a case where the cutting region extends between the both end portions of the tooth flank. The clearance serves as a grease trap during power transmission to thereby enhance a grease lubrication property of the worm gear mechanism.

(f) In an eleventh aspect of the present invention, there is provided the worm wheel according to the first aspect, wherein the non-cutting region is provided on the respective tooth flanks so as to extend over the whole depth of the teeth.

As a result, it is possible to obtain the effect of suppressing voids generation over a whole depth of the teeth.

(g) In a twelfth aspect of the present invention, there is provided the worm wheel according to the first aspect, wherein the non-cutting region is provided only in one of opposite end portions of the tooth flank in the axial direction of the worm wheel main body which is located on the side of a leading end of the tooth flank in a direction of meshing the worm wheel with the worm shaft (i.e., in a direction of rotation of the worm wheel).

Since the non-cutting region is provided only in one of opposite end portions of the tooth flank in the axial direction of the worm wheel main body which is located on the side of a leading end of the tooth flank in the direction of meshing the worm wheel with the worm shaft, the non-cutting region can serve as a grease trap so that the worm gear mechanism can be increased in lubrication property.

(h) In a thirteenth aspect of the present invention, there is provided an electric power steering apparatus including a steering mechanism coupled to steerable road wheels, a reduction mechanism which is coupled to the steering mechanism and includes a worm wheel and a worm shaft meshing with the worm wheel, an electric motor coupled to the reduction mechanism, and a control circuit which drivingly controls the electric motor, wherein the worm wheel according to the first aspect of the present invention is used as the worm wheel of the reduction mechanism, and the worm shaft is disposed such that a rotation axis of the worm shaft is disposed in parallel with a plane perpendicular to a rotation axis of the worm wheel.

Since the worm shaft is arranged such that a rotation axis of the worm shaft is disposed in parallel with a plane perpendicular to a rotation axis of the worm wheel, it is possible to reduce an axial length of a steering shaft coupled to the reduction mechanism and make an outer contour of the electric power steering apparatus compact.

(i) In a fourteenth aspect of the present invention, there is provided the worm wheel according to the third aspect, wherein the non-cutting region is provided in at least one end portion of the tooth bottom in the axial direction of the worm wheel main body.

Voids tend to be generated to a largest extent between the tooth bottoms adjacent to each other. Therefore, generation of the voids between the adjacent tooth bottoms can be suppressed by providing the non-cutting region in the at least one portion of the tooth bottom in the axial direction of the worm wheel main body.

(j) In a fifteenth aspect of the present invention, there is provided the worm wheel according to the fourteenth aspect, wherein the non-cutting region is provided in both end portions of the tooth bottom in the axial direction of the worm wheel main body.

Since voids tends to be generated to a largest extent between the tooth bottoms adjacent to each other, generation of the voids between the adjacent tooth bottoms can be further suppressed by providing the non-cutting regions in the both end portions of the tooth bottom in the axial direction of the worm wheel main body.

(k) In a sixteenth aspect of the present invention, there is provided the worm wheel according to the third aspect, wherein the non-cutting region is provided in the at least one end portion of the respective tooth flanks in the axial direction of the worm wheel main body, and the non-cutting region is configured such that when the worm wheel and the worm shaft are in meshing engagement with each other, a predetermined clearance is formed between the non-cutting region provided in the at least one end portion of the respective tooth flanks and the worm shaft.

The term "clearance" used herein means a distance between the worm shaft and the non-cutting region which is larger than a distance between the worm shaft and the end portion of the tooth flank which is formed in a case where the cutting region extends between the both end portions of the tooth flank. The clearance serves as a grease trap during power transmission to thereby enhance a grease lubrication property of the worm gear mechanism.

(l) In a seventeenth aspect of the present invention, there is provided the method of forming a worm wheel according to the fifth aspect, wherein the method further includes a third step of removing burr generated on the worm wheel upon cutting in the second step, after completion of the second step.

By subjecting the worm wheel to deburring, the worm wheel can achieve smooth meshing engagement with the worm shaft to thereby enhance a power transmission efficiency. Meanwhile, even in a case where a portion of the non-cutting region present before conducting the deburring might be removed in the deburring step, the effect of the present invention may be obtained as long as the non-cutting region remains.

(m) In an eighteenth aspect of the present invention, there is provided the method of forming a worm wheel according to the fifth aspect, wherein the second step further includes cutting a portion of the primary tooth bottom to thereby provide the non-cutting region in at least one end portion of the secondary tooth bottom in an axial direction of the worm wheel main body.

Since voids tend to be generated to a largest extent between the tooth bottoms adjacent to each other, void generation can be suppressed by providing the non-cutting region in at least one end portion of the secondary tooth bottom in the axial direction of the worm wheel main body.

(n) In a nineteenth aspect of the present invention, there is provided the method of forming a worm wheel according to the eighteenth aspect, wherein a shape of the at least one end portion of the secondary tooth bottom in which the non-cutting region is provided is formed to be parallel with the rotation axis of the worm wheel.

In a case where the cutting region is provided to extend over an entire length of the secondary tooth bottom between the both end portions of the secondary tooth bottom, the angle formed by the both end portions of the secondary tooth bottom and an axial end surface of the worm wheel main body will become an acute angle. The reason why the acute angle is formed is that the secondary tooth bottom cut by the hob has a concaved arc shape in a sectional view. In contrast, since the shape of the at least one end portion of the secondary tooth bottom in which the non-cutting region is provided is formed to be parallel with the rotation axis of the worm wheel, the angle formed by the at least one end portion of the secondary tooth bottom and the axial end surface of the worm wheel main body becomes about 90 degrees, it is possible to increase in strength in the at least one end portion of the secondary tooth bottom or reduce stress concentration thereon.

(o) In a twentieth aspect of the present invention, there is provided the method of forming a worm wheel according to the fifth aspect, wherein only one side of the respective primary tooth flanks in a direction of a rotation axis of the worm wheel main body is formed into the non-cutting region, and the other side of the respective primary tooth flanks in the direction of a rotation axis of the worm wheel main body is formed into an undercut shape relative to the mold used in the injection molding in the first step. By forming the other side of the respective tooth flanks of the primary teeth in the direction of the rotation axis of the worm wheel main body into the undercut shape, it is possible to facilitate the work of taking out the preformed worm wheel from the mold i.e., to allow so-called forcible removal thereof, as compared to the case where the undercut shape is formed on both sides of the respective tooth flanks of the primary teeth in the direction of the rotation axis of the worm wheel main body. The other side of the respective tooth flanks of the primary teeth where the undercut shape is formed has a relatively increased width (width in a rotational direction of the worm wheel) to thereby be subjected to cutting. However, the method of forming a worm wheel according to the twentieth aspect can attain the same function and effect as those of the method of forming a worm wheel according to the fifth aspect as long as the non-cutting region is provided on at least one side of the teeth in the axial direction of the worm wheel main body.

This application is based on a prior Japanese Patent Application No. 2009-288927 filed on Dec. 21, 2009. The entire contents of the Japanese Patent Application No. 2009-288927 are hereby incorporated by reference.

Although the invention has been described above by reference to certain embodiments of the invention and modifications of the embodiments, the invention is not limited to the embodiments and modifications described above. Further variations of the embodiments and modifications described above will occur to those skilled in the art in light of the above teachings. The scope of the invention is defined with reference to the following claims.

What is claimed is:

1. A worm wheel comprising:
an annular worm wheel main body comprising a resin material; and
teeth on an outer periphery of the annular worm wheel main body in a circumferential direction of the annular worm wheel main body, the teeth comprising tooth flanks configured to be brought into meshing engagement with a worm shaft, a tooth crest on an outer peripheral surface of each of the teeth, and a tooth bottom between each adjacent pair of the tooth flanks that face each other in the circumferential direction of the annular worm wheel main body;
a first region on each of the tooth flanks, the first region being offset from a mid-position of a whole depth of each of the teeth in a radially outward direction of the annular worm wheel main body, the first region in at least one end portion of each of the tooth flanks in an axial direction of the annular worm wheel main body, the first region configured to form a predetermined clearance between the first region in the at least one end portion of each of the tooth flanks and the worm shaft when the worm wheel and the worm shaft are in meshing engagement with each other; and
a second region on each of the tooth flanks, the second region being a cut-out portion,
wherein the first region is in a portion of each of the tooth flanks that is on a radial outside of a pitch circle.

2. The worm wheel as claimed in claim 1, wherein the first region is in at least one end portion of the tooth bottom in the axial direction of the annular worm wheel main body.

3. The worm wheel as claimed in claim 2, wherein the first region is in both end portions of the tooth bottom in the axial direction of the annular worm wheel main body.

4. The worm wheel as claimed in claim 2, wherein a shape of each end portion of the tooth bottom, in which the first region is, is formed to be parallel with a rotation axis of the worm wheel.

5. The worm wheel as claimed in claim 1, wherein the first region is on a circumference of the pitch circle.

6. The worm wheel as claimed in claim 1, wherein the first region extends over a whole depth of each of the teeth.

7. The worm wheel as claimed in claim 1, wherein the first region is only in one of opposite end portions of each of the tooth flanks in the axial direction of the annular worm wheel main body which is on a side of a leading end of each of the tooth flanks in a direction of meshing the worm wheel with the worm shaft.

8. An electric power steering apparatus comprising:
a steering mechanism coupled to steerable road wheels;
a reduction mechanism coupled to the steering mechanism, the reduction mechanism including a worm wheel and a worm shaft meshing with the worm wheel;
an electric motor coupled to the reduction mechanism; and
a control circuit which drivingly controls the electric motor,
wherein the worm wheel according to claim 1 is used as the worm wheel of the reduction mechanism, and
the worm shaft is disposed such that a rotation axis of the worm shaft is inclined relative to a plane perpendicular to a rotation axis of the worm wheel to make an acute angle between the rotation axis of the worm shaft and the plane perpendicular to the rotation axis of the worm wheel.

9. An electric power steering apparatus comprising:
a steering mechanism coupled to steerable road wheels;
a reduction mechanism coupled to the steering mechanism, the reduction mechanism including a worm wheel and a worm shaft meshing with the worm wheel;
an electric motor coupled to the reduction mechanism; and
a control circuit which drivingly controls the electric motor,
wherein the worm wheel according to claim 1 is used as the worm wheel of the reduction mechanism, and the worm shaft is disposed such that a rotation axis of the worm shaft is parallel to a plane perpendicular to a rotation axis of the worm wheel.

10. The worm wheel as claimed in claim 1, wherein the first region is at an end portion on a side of the tooth crest in the radially outward direction of the annular worm wheel main body.

* * * * *